United States Patent
Kokura

(10) Patent No.: US 11,200,643 B2
(45) Date of Patent: Dec. 14, 2021

(54) IMAGE PROCESSING APPARATUS, IMAGE PROCESSING METHOD AND STORAGE MEDIUM FOR ENHANCING RESOLUTION OF IMAGE

(71) Applicant: CANON KABUSHIKI KAISHA, Tokyo (JP)

(72) Inventor: Toru Kokura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/710,753

(22) Filed: Dec. 11, 2019

(65) Prior Publication Data
US 2020/0202496 A1  Jun. 25, 2020

(30) Foreign Application Priority Data
Dec. 21, 2018 (JP) .............................. JP2018-239861

(51) Int. Cl.
*G06T 5/00* (2006.01)
*G06T 5/50* (2006.01)
*G06T 15/20* (2011.01)

(52) U.S. Cl.
CPC ............... *G06T 5/003* (2013.01); *G06T 5/50* (2013.01); *G06T 15/20* (2013.01); *G06T 2207/20081* (2013.01); *G06T 2207/20084* (2013.01); *G06T 2207/30196* (2013.01)

(58) Field of Classification Search
None
See application file for complete search history.

(56) References Cited

U.S. PATENT DOCUMENTS

| 7,949,186 B2* | 5/2011 | Grauman | G06K 9/6269 382/170 |
| 2011/0026849 A1* | 2/2011 | Kameyama | G06K 9/00308 382/260 |
| 2011/0316884 A1* | 12/2011 | Giambalvo | G06F 16/44 345/660 |
| 2014/0307971 A1* | 10/2014 | Hanzawa | G06T 3/4053 382/195 |
| 2019/0130278 A1* | 5/2019 | Karras | G06N 3/082 |

FOREIGN PATENT DOCUMENTS

JP  2018045302 A  3/2018

* cited by examiner

*Primary Examiner* — Jeffrey J Chow
(74) *Attorney, Agent, or Firm* — Carter, DeLuca & Farrell LLP

(57) ABSTRACT

The image processing apparatus has: an image acquisition unit configured to acquire a captured image of an image capturing area in which an object is located; a determination unit configured to determine parameters to be used for image processing to improve resolution of an image of the object, by learning using a dataset of images of the object, wherein the dataset is generated based on object information indicating a degree of importance of the object; and a processing unit configured to perform the image processing to improve the resolution of an image of the object included in the acquired captured image, using the parameters determined by the determination unit.

20 Claims, 11 Drawing Sheets

IMAGE PROCESSING APPARATUS, IMAGE PROCESSING METHOD AND STORAGE MEDIUM FOR ENHANCING RESOLUTION OF IMAGE

BACKGROUND OF THE INVENTION

Field of the Invention

The present invention relates to a technique to enhance the resolution of an image by making use of learning.

Description of the Related Art

As a resolution enhancement technique to convert a first image into a second image whose resolution is higher, there is a method that makes use of machine learning. In this method, conversion parameters used to convert the first image into the second image are found in advance by learning.

As a method of finding conversion parameters with a high accuracy, there is a method of performing learning using a dataset in accordance with the image capturing condition of the image and the class of the image, such as an object. Japanese Patent Laid-Open No. 2018-45302 has disclosed a technique to reduce the calculation cost and improve the recognition accuracy by performing learning for each class obtained by performing clustering of training images. Note that, at the time of performing the resolution enhancement of an image by learning using the conventional technique, there is a case where it is not possible to obtain the image of an important object with a sufficient resolution. There is a tendency for the time necessary for the processing to enhance the resolution of an image to be extended as the target resolution becomes high. Because of this, for example, in a case where it is required to perform the resolution enhancement of an image in a short time, it is considered that the target resolution is set low, and therefore, an image with a sufficient resolution is not obtained.

SUMMARY OF THE INVENTION

The image processing apparatus according to one aspect of the present invention includes: an image acquisition unit configured to acquire a captured image of an image capturing area in which an object is located; a determination unit configured to determine parameters to be used for image processing to improve resolution of an image of the object, by learning using a dataset of images of the object, wherein the dataset is generated based on object information indicating a degree of importance of the object; and a processing unit configured to perform the image processing to improve the resolution of an image of the object included in the acquired captured image, using the parameters determined by the determination unit.

Further features of the present invention will become apparent from the following description of exemplary embodiments with reference to the attached drawings.

DESCRIPTION OF THE EMBODIMENTS

In the following, embodiments of the present invention are explained with reference to the drawings. Note that components described in the embodiments are merely exemplary and are not intended to limit the scope of the present invention to those. Further, all combinations of the components explained in the embodiments are not necessarily indispensable to the solution to solve the problems and there can be various modifications and changes.

First Embodiment

<Entire Configuration of Image Capturing System>

In the present embodiment, a case is explained as an example where a sports player is captured as an object in a stadium and the resolution enhancement of the image of the sports player is performed.

Figure 1:
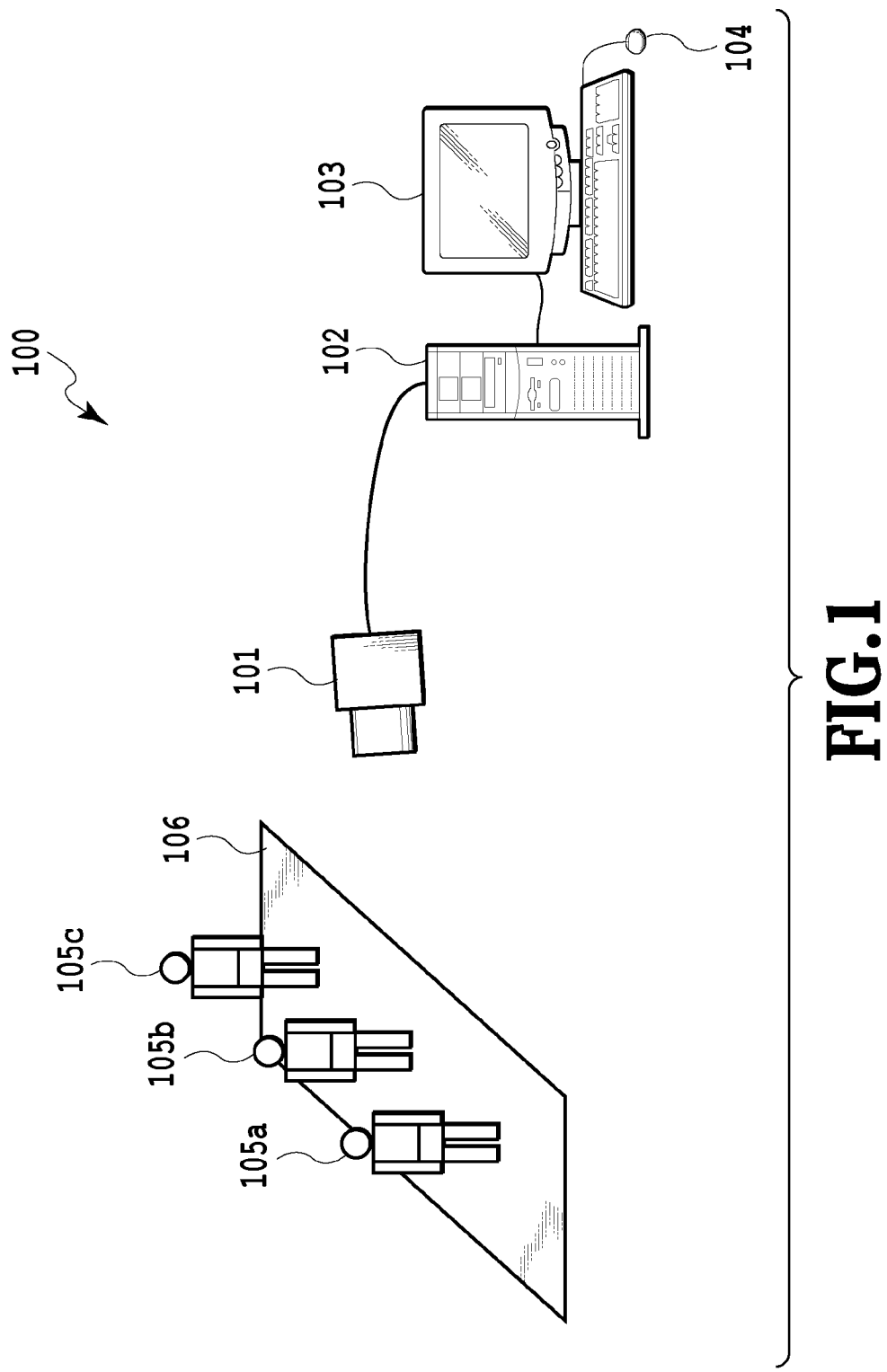
FIG. 1 is a schematic diagram of an image capturing system example including an image processing apparatus according to a first embodiment.
Figure 2A:
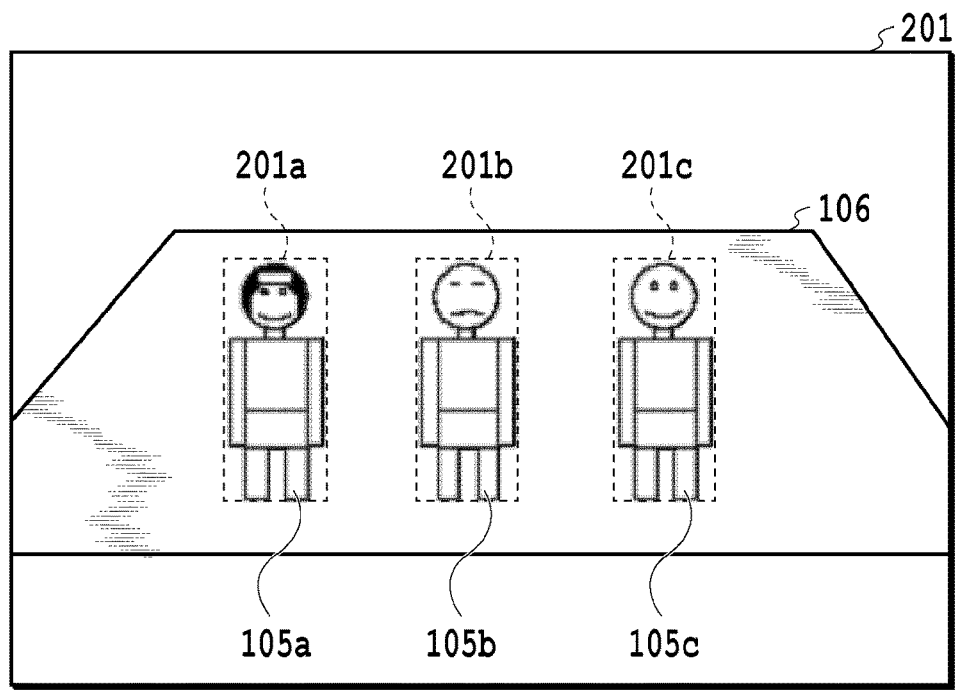
FIG. 2A and FIG. 2B are each a diagram showing an image example acquired by an image capturing apparatus.
Figure 2B:
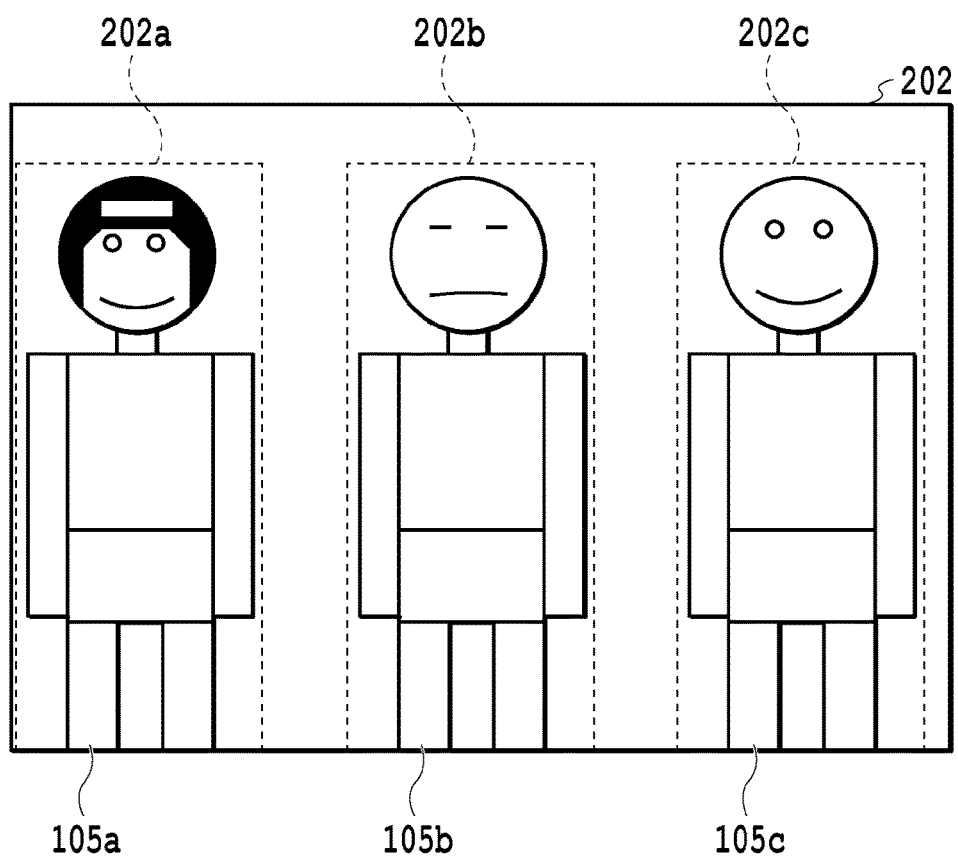

FIG. 1 is a schematic diagram showing an image capturing system example including an image processing apparatus according to the present embodiment. FIG. 2A is a diagram showing an input image example. FIG. 2B is a diagram showing a training image example.

An image capturing system 100 has an image capturing apparatus 101, an image processing apparatus 102, a display device 103, and an operation device 104. These apparatuses 101 and 102 and devices 103 and 104 are connected so as to be capable of transmission and reception of data with one another.

The image capturing apparatus 101 is a camera capable of adjusting the focal length and which captures an object, and captures three sports players 105a, 105b, and 105c located on a field 106 of a stadium, which is an image capturing area. The image capturing apparatus 101 acquires input image data (hereinafter, referred to as input image) 201a to 201c, which are the resolution enhancement target, from captured image data (hereinafter, referred to as input image) obtained by capturing the objects. The input images (partial images) 201a, 201b, and 201c are images obtained by cutting out the object areas corresponding to the sports players 105a, 105b, and 105c respectively from the image 201. Further, the image capturing apparatus 101 acquires training image data (hereinafter, referred to as training image) 202a to 202c for learning from high-resolution image data (hereinafter, referred to as high-resolution image) whose resolution is high compared to that of the captured image 201, which is obtained by capturing the objects by changing (adjusting)

the focal length. The training images 202a to 202c are images obtained by cutting out the object areas corresponding to the sports players 105a, 105b, and 105c respectively from the image 202. In a case where the training image and the input image are images acquired form the images captured substantially the same time of the same day, the illumination conditions of both are substantially the same, and therefore, the accuracy of resolution enhancement of an image, whose details will be described later, improves. Consequently, the image capturing system 100 may have a plurality of the image capturing apparatuses 101 whose focal lengths are different and as the training image data for enhancing the resolution of the captured image obtained by one of the image capturing apparatuses 101, the captured image obtained by the other image capturing apparatus 101 may be used. Note that this is not limited and as the training image data for enhancing the resolution of the capture image obtained by a certain one of the image capturing apparatuses 101, the captured image obtained by the same image capturing apparatus 101 at a different time may be used.

The acquisition method of a training image is not limited to changing the focal length of the image capturing apparatus. For example, it may also be possible to acquire a training image from a high-resolution image obtained by performing image capturing by changing the image capturing distance, making use of an image in which an object is captured at the front of the screen, performing image capturing by using an image capturing apparatus whose number of pixels is higher, acquiring from a database or a web, and so on.

The image processing apparatus 102 derives conversion parameters by learning using a dataset by training images, which corresponds to the level, and generates resolution-enhanced images obtained by enhancing the resolutions of the input images 201a to 201c based on the derived conversion parameters. Then, the image processing apparatus 102 outputs an image in which the input images 201a to 201c of the captured image 201 are replaced with the resolution-enhanced images.

In the present embodiment, although the example is described in which the resolution enhancement of an image is performed as a task of machine learning, it is also possible to apply the present embodiment to an example in which another image conversion, such as resolution adjustment of an image, is performed. Further, although the example is described in which clustering of training images is performed for each object, it is also possible to apply the present embodiment to an example in which clustering is performed with another reference, such as for each behavior of an object, for each behavior of another object for an object, and for each environment. As the behavior of an object, mention is made of, for example, a predetermined movement of an object specified based on an image extracted by a person tracking or the like in a plurality of successive images, and the like. As the predetermined movement, mention is made of, for example, in a case of soccer, a shot, a dribble, and the like. As the behavior of another object for an object, mention is made of, for example, a predetermined movement of another object for an object, which is specified based on an image extracted by a person recognition, person collation, person tracking, or the like in a plurality of successive images. As the predetermined movement of another object for an object, mention is made of, for example, in a case of soccer, an intercept, or in a case of rugby, a tackle, in which another object exists at a position that makes the object difficult to see from the image capturing apparatus. As the environment, mention is made of, for example, an image capturing environment under the weather of rain and the like, in the image capturing time zone, such as in the night, and the like. Although the example of the sports scene in the stadium is explained, it is also possible to apply the present embodiment to a general scene.

The display device 103 is one of various image display devices, such as a liquid crystal display, which displays an image presenting information to a user. The operation device 104 is, for example, a mouse, a keyboard, or the like and used for receiving an operation by a user and inputting various instructions to the image processing apparatus 102.

Figure 3:
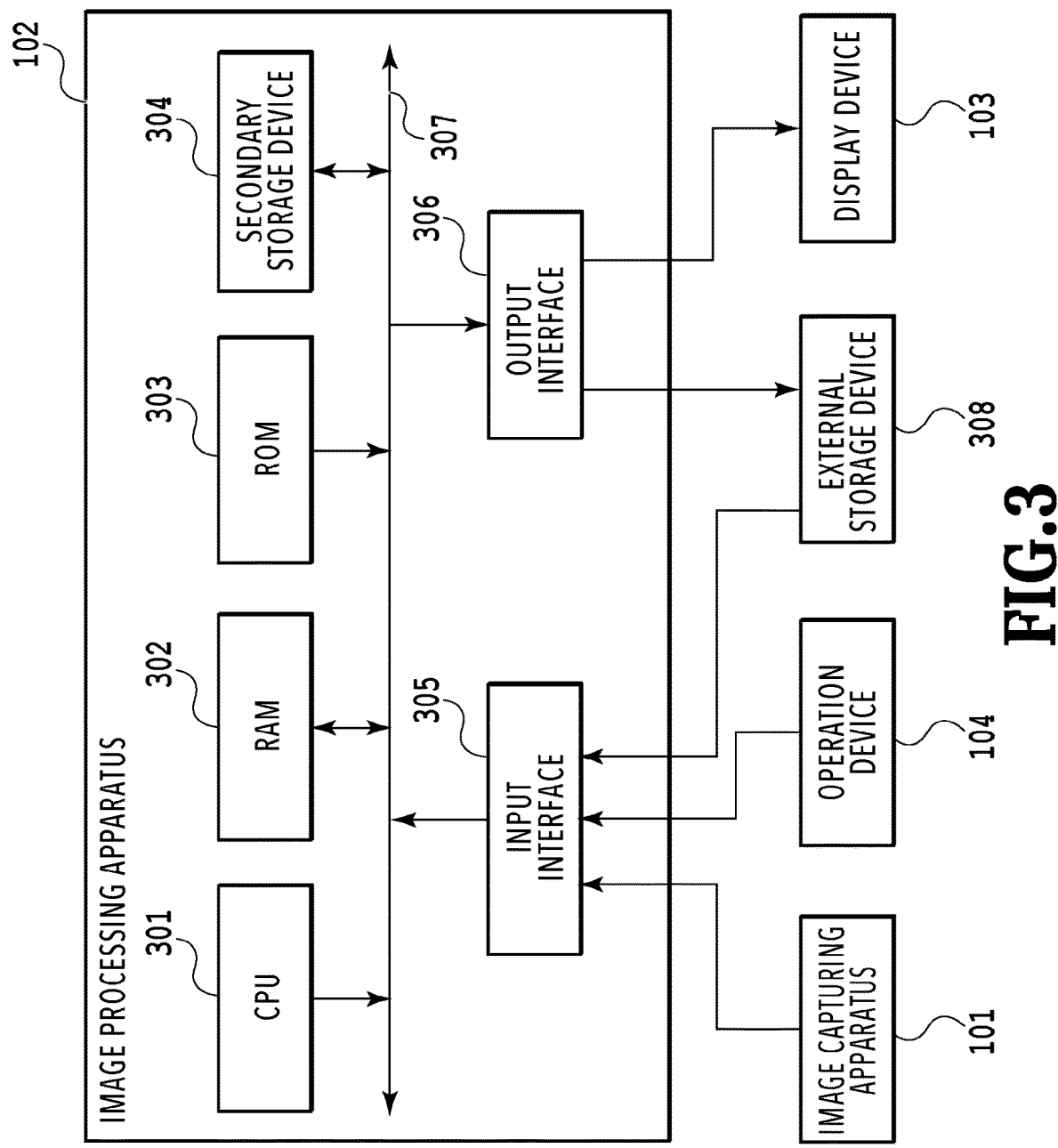
FIG. 3 is a diagram showing a hardware configuration example of the image processing apparatus.

FIG. 3 is a diagram showing a hardware configuration example of the image processing apparatus 102. The image processing apparatus 102 has a CPU 301, a RAM (Random Access Memory) 302, a ROM 303, a secondary storage device 304, an input interface (hereinafter, "interface" is described as "I/F") 305, and an output I/F 306. Each unit configuring the image processing apparatus 102 is connected to one another via a system bus 307. Further, the image processing apparatus 102 is connected to the image capturing apparatus 101, the operation device 104, and an external storage device 308 via the input I/F 305. Furthermore, the image processing apparatus 102 is connected to the external storage device 308 and the display device 103 via the output I/F 306.

The CPU 301 performs programs stored in the ROM (Read Only Memory) 303 by using the RAM 302 as a work area and centralizedly controls each unit of the image processing apparatus 102 via the system bus 307. Due to this, various pieces of processing, to be described later, are performed. The secondary storage device 304 is a storage device storing various kinds of image data handled by the image processing apparatus 102, parameters for processing, and the like. As the secondary storage device 304, it is possible to use, for example, an HDD, an optical disc drive, a flash memory, and the like. It is possible for the CPU (Central Processing Unit) 301 to write data to the secondary storage device 304 and read data stored in the secondary storage device 304 via the system bus 307.

The input I/F 305 is a serial bus interface, for example, such as USB and IEEE 1394. The input of data, commands, and the like to the image processing apparatus 102 from an external device is performed via the input I/F 305. The image processing apparatus 102 acquires various kinds of data (for example, image data captured by the image capturing apparatus 101, data such as image capturing condition parameters of the image capturing apparatus 101) from the image capturing apparatus 101 via the input I/F 305. Further, the image processing apparatus 102 acquires data from the external storage device 308 (for example, storage media, such as hard disk, memory card, CF card, SD card, and USB memory) via the input I/F 305. Furthermore, the image processing apparatus 102 acquires a command by a user, which is input by using the operation device 104 via the input I/F 305.

The output I/F 306 includes a serial bus interface, such as USB and IEEE 1394, like the input I/F 305. In addition, it is also possible to use a video image output terminal, for example, such as DVI and HDMI (registered trademark) as the output I/F 306. The output of data and the like from the image processing apparatus 102 to an external device is performed via this output I/F 306. The image processing apparatus 102 writes data to the external storage device 308 via the output I/F 306. The image processing apparatus 102 displays an image by outputting image data processed by the image processing apparatus 102 to the display device 103 via the output I/F 306. Although components of the image processing apparatus 102 exist other than those described above, they are not the main purpose of the present invention, and therefore, explanation is omitted.

<Outline of Highly Accurate Resolution Enhancement Processing>

In general, in order to perform highly accurate resolution enhancement processing, it is necessary to spend a high calculation cost, such as to increase the calculation time and the calculation machine resource. Further, it is considered that the degree of importance of performing resolution enhancement processing is not uniform for each class. For example, in a case where image capturing is performed by taking a sports player as an object in a stadium, it is considered that the degree of importance is different for each player. A player whose activity is remarkable and a popular player are likely to receive attention from a user, and therefore, it is desirable for the resolutions of them to be high on an image. Consequently, for the important player whose degree of interest is high, highly accurate learning is performed by spending the calculation cost. On the contrary, for a player whose degree of interest is low, who is unlikely to receive attention from a user, the calculation cost is reduced by reducing the accuracy of learning.

In order to adjust the calculation cost and the accuracy of learning, in the present embodiment, the magnification of the resolution enhancement processing is changed. Here, the magnification refers to the ratio between the numbers of pixels before and after the resolution enhancement processing. It may also be possible to define the degree of increase in the high-frequency component by the resolution enhancement processing as the magnification. In general, for the resolution enhancement processing with a high magnification, although the calculation cost increases, the accuracy of the resolution enhancement processing improves. In the image processing based on the present embodiment, learning is performed by giving a target value indicating in which degree the resolution is enhanced to each object. This target value is called a resolution enhancement level and the magnification is given to each object based on the resolution enhancement level. Specifically, in a case where the resolution enhancement level is high, a high magnification is given to an object, in a case where the resolution enhancement level is medium, a medium magnification is given to an object, and in a case where the resolution enhancement level is low, a low magnification is given to an object, respectively.

The object to which a high resolution enhancement level should be set is an object whose degree of interest from a user is high, such as a player whose activity is remarkable or a famous player. On the other hand, for a player existing at a position far from the position at which an importance event occurs or a player who is hard to see from the image capturing apparatus because the player is hidden by another player in the image capturing direction, it is considered that the degree of importance of resolution enhancement is low. Further, for a player whose number of training images is small, it is difficult to improve the accuracy of learning even by spending the calculation cost, and therefore, it is desirable to set a low resolution enhancement level.

<Configuration of Image Processing Apparatus and Flow of Processing>

Figure 4:
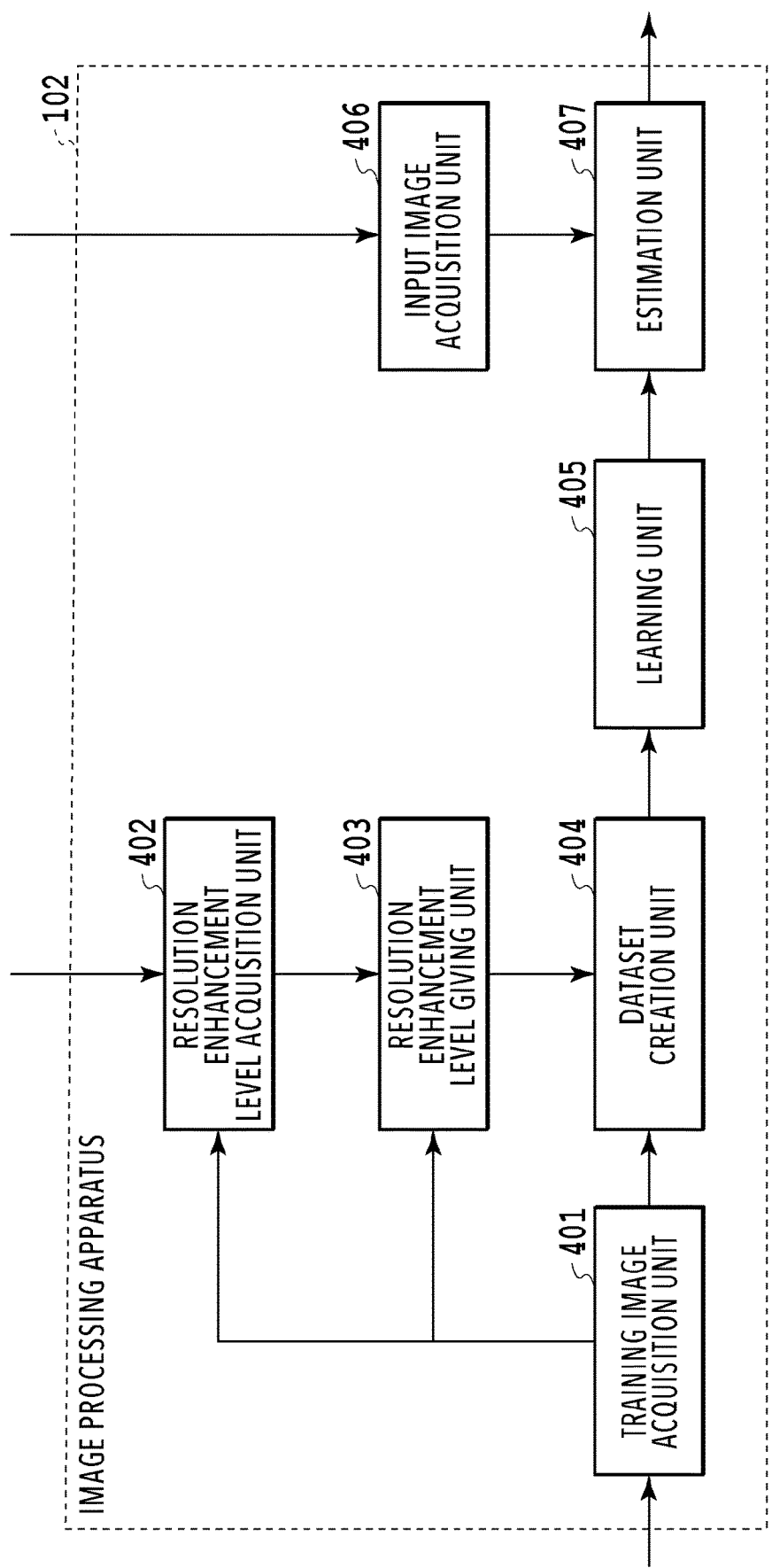
FIG. 4 is a block diagram showing a function configuration example of the image processing apparatus.
Figure 5:
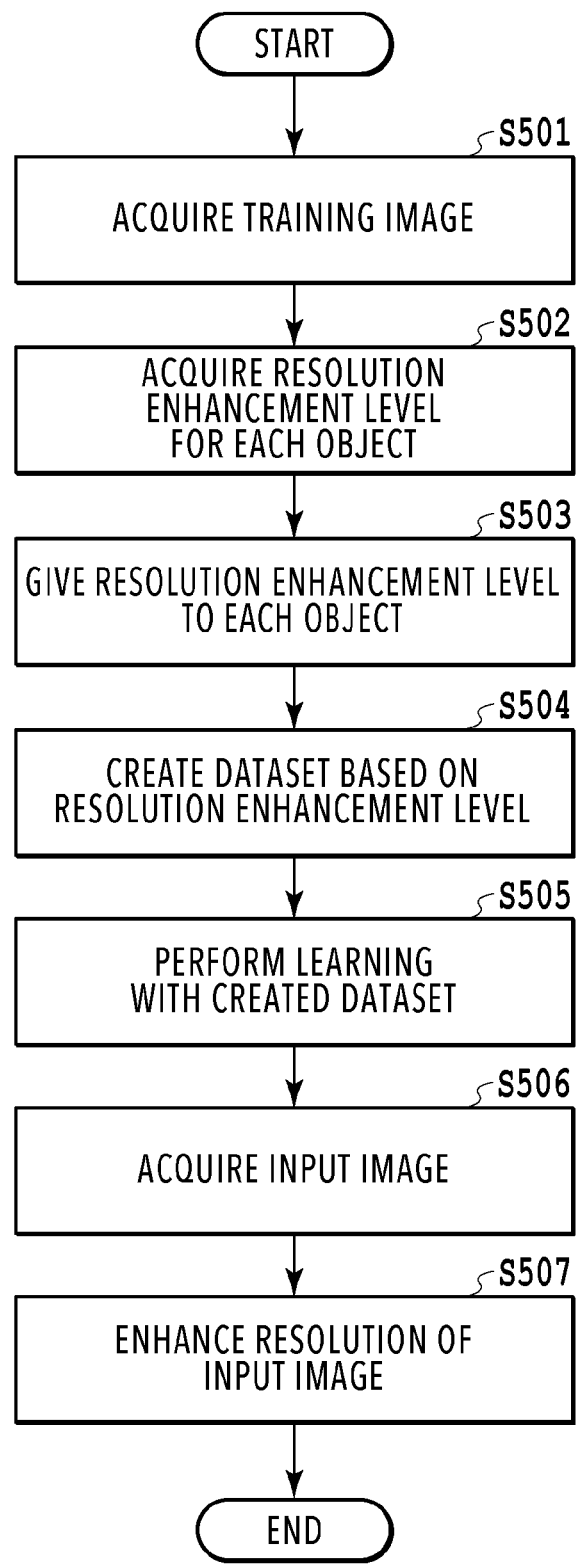
FIG. 5 is a flowchart showing a procedure example of image conversion processing.

Processing performed by the image processing apparatus 102 is explained with reference to FIG. 4 and FIG. 5. FIG. 4 is a block diagram showing a function configuration example of the image processing apparatus 102. FIG. 5 is a flowchart showing a procedure example of image conversion processing. The image processing apparatus 102 functions as each unit shown in FIG. 4 by the CPU 301 executing a program stored in the ROM 303 by using the RAM 302 as a work memory and performs the series of processing shown in the flowchart in FIG. 5. It is not necessary for all the processing shown in the following to be performed by the CPU 301 and it may also be possible to configure the image processing apparatus 102 so that part or all of the processing is performed by one or a plurality of processing circuits other than the CPU 301. Symbol "S" in the explanation of each piece of processing means a step in the flowchart. In the following, a flow of processing performed by each unit is explained.

First, processing in the learning stage is explained.

At S501, a training image acquisition unit 401 acquires an image (hereinafter, also referred to as a high-resolution image) obtained by capturing an object with a high resolution from the image capturing apparatus 101, the secondary storage device 304, or the external storage device 308. Then, the training image acquisition unit 401 acquires a training image obtained by cutting out an object area corresponding to an object (for example, a sports player and the like) by a publicly known technique, such as a person recognition and an area division, from the acquired high-resolution image. Next, the training image acquisition unit 401 classifies training images according to object (for example, sports player) by a publicly known technique, such as a person collation and a person tracking. The training images classified according to object are output to a resolution enhancement level acquisition unit 402, a resolution enhancement level giving unit 403, and a dataset creation unit (dataset construction unit) 404, respectively. The number of acquired high-resolution images and the number of training images are not limited and may be one or two or more.

At S502, the resolution enhancement level acquisition unit 402 derives and acquires a resolution enhancement level based on the training image input from the training image acquisition unit 401 and the object information indicating the degree of importance of an object, which is input from the outside. That is, the resolution enhancement level acquisition unit 402 derives and acquires a resolution enhancement level based on the acquired training image and the object information.

The object information may be information stored in advance in the secondary storage device 304 or the external storage device 308, or information directly input by a user to the image processing apparatus 102 via the operation device 104. In a case of capturing a sports player as an object in a stadium, the object information includes at least one of the following information. As the information, mention is made of, for example, an event (behavior of an object, behavior of another object for an object) for each sports player during a game and a profile (attribute of an object) of a sports player. As for the event for each sports player during a game, it may also be possible to set high the degree of importance of a sports player in a case where, for example, the number of scores, the ball possession ratio, the number of times of being captured by a broadcast camera, or the like is large or the cheer is big, and to set low the degree of importance of a sports player in a case where those numbers and the cheer are small. As for the profile of a sports player, it may also be possible to set high the degree of importance of a sports player in a case where, for example, the degree of interest with respect to sex, nationality, past winning percentage, popularity, or the like is high and to set low the degree of importance of a sports player in a case where the degree of interest is low.

Further, it may also be possible to include the number of training images of the target object and results of deriving the degree (variance) of the variation in the training image in the object information. The degree of the variation in the training image is derived based on the number of kinds of illumination condition and the number of image capturing directions of the image capturing apparatus. For example, in a case where the number of a variety of illumination conditions and the number of training images are large, the variance becomes large and in a case where the number of a variety of illumination conditions and the number of training images are small, the variance becomes small.

It is possible to represent the object information as a vector x having a plurality of variables as components. As the component, mention is made of, for example, the event for each sports player during a game, the profile of a sports player, the number of training images of the target object, the degree of the variation in the training image, and the like. It is possible to represent the object information by the vector x, and therefore, in a case where a conversion function is taken to be f and the resolution enhancement level to be y, it is possible to represent the resolution enhancement level y by derivation results of an equation y=f (x). The conversion function f is a linear regression equation and the regression coefficient thereof is determined in advance in accordance with the degree of importance of each component of the vector x. The conversion function f is not limited to the linear regression equation and a general regression equation or a general function may be accepted.

The resolution enhancement level acquisition unit 402 derives the resolution enhancement level explained above for each object. The derived and obtained resolution enhancement level is output to the resolution enhancement level giving unit 403.

At S503, the resolution enhancement level giving unit 403 gives the resolution enhancement level input from the resolution enhancement level acquisition unit 402 to each object of the training image input from the training image acquisition unit 401. In a case of giving the resolution enhancement level to the object, it may also be possible for a user to set a time limit that can be spent for learning, to be described later, and input the set time limit to the image processing apparatus 102 via the operation device 104. In that case, the resolution enhancement level is derived again by scaling processing or the like so that the learning is completed within the time limit (within a predetermined time) and the resolution enhancement level derived again is given to each object. As a scaling processing example, a case is considered where the time necessary for the learning is proportional to the square of the resolution enhancement level. In a case where the estimated time necessary for the learning is a times the time limit, each resolution enhancement level is corrected to $1/\sqrt{\alpha}$ times. The resolution enhancement level given to each object is output to the dataset creation unit 404.

At S504, the dataset creation unit 404 creates (constructs) a dataset for each object based on the training image input from the training image acquisition unit 401 and the resolution enhancement level input from the resolution enhancement level giving unit 403 in accordance with the degree of importance of the object. Specifically, the dataset creation unit 404 creates a low-resolution image for learning obtained by reducing the resolution of the training image to the resolution corresponding to that of the input image for each object. The resolution corresponding to that of the input image is already known before performing the processing at S504, and therefore, the dataset creation unit 404 acquires in advance the information relating to the resolution corresponding to that of the input image before performing the processing at S504. Next, the dataset creation unit 404 creates a high-resolution image for learning obtained by reducing the resolution of the training image that is based on the created low-resolution image for learning so that the resolution is r times that of the low-resolution image in accordance with the resolution enhancement level and the lookup table. The lookup table is a table indicating a relationship between the resolution enhancement level and the magnification r and determined in advance. Following the above, the dataset creation unit 404 creates a dataset for each object as a set of pairs of the low-resolution image for learning and the high-resolution image for learning, which are created based on the same training image.

A dataset D is represented in a form of D={$(p_1, q_1)$, $(p_2, q_2)$, ..., $(p_n, q_n)$} (n is a natural number) as the set of a pair of a high-resolution image q for learning and a low-resolution image p for learning. That is, the dataset creation unit 404 creates a dataset as the set of n pairs of the high-resolution image q for learning and the low-resolution image p for learning from the n training images. Here, "i" of the low-resolution image $p_i$ for learning and the high-resolution image $q_i$ for learning indicates the pair number of the dataset. For example, here, there are three levels for the resolution enhancement level, that is, a low level, a medium level, and a high level and in a case where the resolution enhancement level is the low level, r=2 is set, in a case where the resolution enhancement level is the medium level, r=4 is set, and in a case where the resolution enhancement level is the high level, r=8 is set. In a case where the resolution of the high-resolution image for learning is the same as the resolution of the training image, the resolution enhancement of the training image is not performed. That is, the resolution of the high-resolution image for learning is the same as or lower than that of the training image. The obtained dataset for each object is output to a learning unit 405.

At S505, the learning unit 405 performs learning of conversion parameters for converting a low-resolution image into a high-resolution image in accordance with the resolution enhancement level for each received dataset and determines parameters relating to processing to improve the resolution of the image of an object. That is, in a case where the resolution enhancement level is high, the learning unit 405 performs learning by using the data of all the pairs included in the received dataset. In a case where the resolution enhancement level is medium, the learning unit 405 performs learning by using the data of the number of pairs obtained by thinning the data of a predetermined number of pairs from the data of all the pairs included in the received dataset. In a case where the resolution enhancement level is low, the learning unit 405 performs learning by using the data of the number of pairs obtained by thinning the data of the number of pairs larger than that in a case where the resolution enhancement level is medium from the data of all the pairs included in the received dataset. Here, a publicly known image conversion neural network is used as a learning unit. The obtained conversion parameters for each object are output to an estimation unit (conversion unit) 407.

At S506, an input image acquisition unit 406 acquires an input image obtained by cutting out an object area from the image capturing apparatus 101, the secondary storage device 304, or the external storage device 308. Next, the input image acquisition unit 406 identifies the player corresponding to the object of the input image based on a face recognition or position estimation. The acquired input image is output to the estimation unit 407.

At S507, the estimation unit 407 acquires the conversion parameters from the learning unit 405 and the input image from the input image acquisition unit 406, respectively. Then, the estimation unit 407 performs estimation to obtain an image, which is conversion results, by converting the input image based on the conversion parameters of the same object as the object of the acquired input image. For the estimation, the same neural network as that used in the learning unit 405 is used. At S505 and S507, it may also be possible to use another learning unit, such as SVM (Support Vector Machine) and Random Forest.

The estimation unit 407 outputs the object resolution-enhanced image that is the obtained image of the conversion results to, for example, the display device 103. It may also be possible to output the image obtained by replacing the input images (partial images) 201*a* to 201*c* corresponding to the object area of the captured image 201 with the object resolution-enhanced image to the display device 103.

<Details of Processing of Dataset Creation Unit>

In the present embodiment, the example is described in which the magnification r is determined for each object based on the resolution enhancement level and the dataset is created based on the determined magnification. A parameter that determines the nature of the dataset exists other than the magnification. It may also be possible to determine those parameters based the resolution enhancement level and create a dataset based on the determined parameters. Three examples thereof are described below.

<Region Specialization Type>

Figure 6:
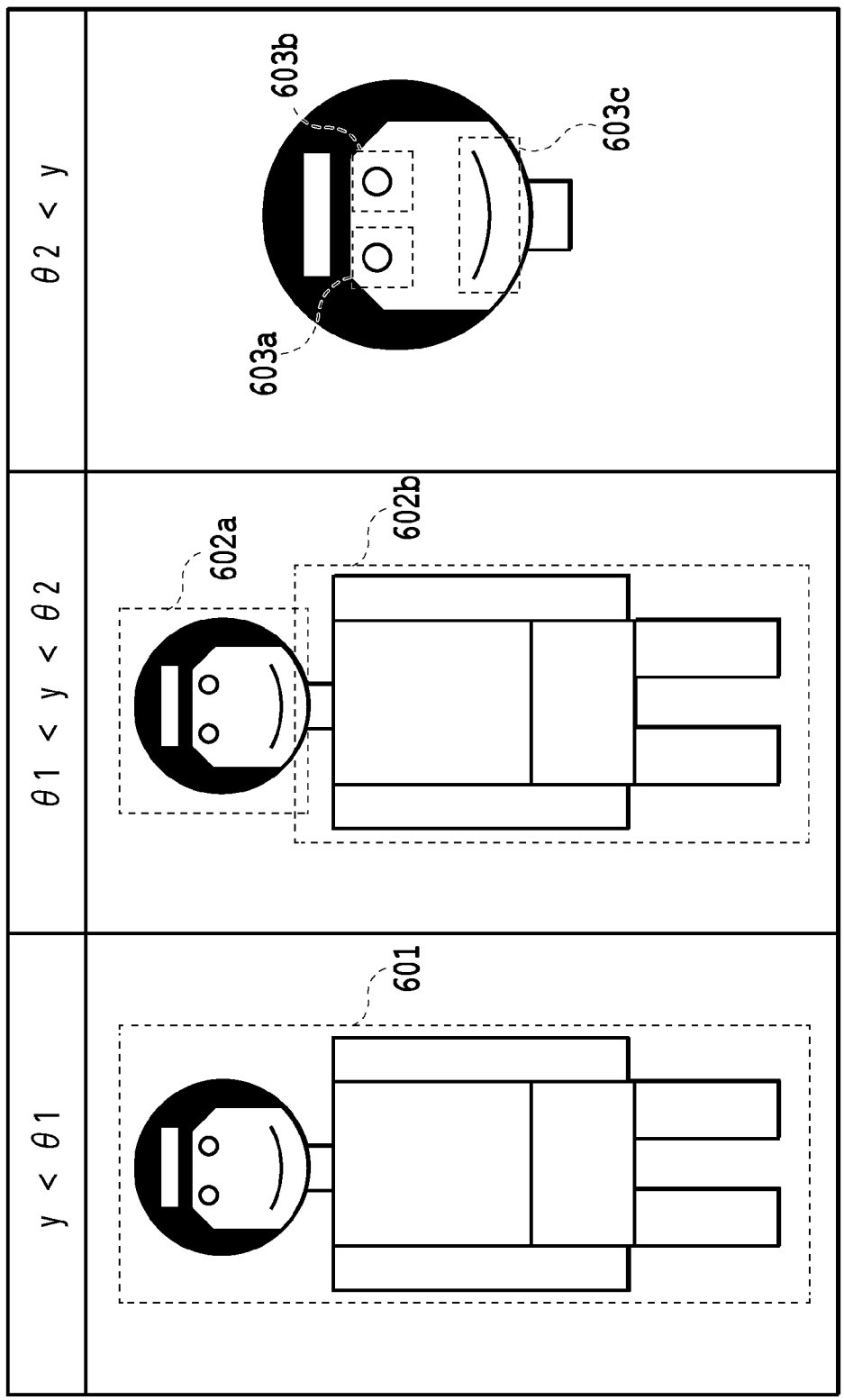
FIG. 6 is a diagram explaining a processing example by a dataset creation unit.

First, it may also be possible to determine a degree indicating to what extent learning specialized in a region is performed based on the resolution enhancement level. A specific example of the processing is shown in FIG. 6. FIG. 6 is a diagram explaining a processing example by the dataset creation unit. Note that it is assumed that a threshold value $\theta_2$ is larger than a threshold value $\theta i$.

First, by a comparison between the resolution enhancement level y and the threshold values $\theta_1$ and $\theta_2$, the degree of division of the training image (object image) is divided into three levels. In a case where the resolution enhancement level y is small, that is, in a case where the resolution enhancement level y is smaller than the threshold value $\theta_1$ (y<$\theta_1$), the learning unit 405 is caused to learn a full-body image 601 of the object, which includes the face (head) and the full body of the object. In a case where the resolution enhancement level y is medium, that is, in a case where the resolution enhancement level y is larger than the threshold value $\theta_1$ and smaller than the threshold value $\theta_2$ ($\theta_1$<y<$\theta_2$), the object is divided into the following regions by a region recognition and a separate dataset is created for each divided region. As the target for which the object image is divided into regions, mention is made of, for example, a face image 602*a* corresponding to the face (head) and a body image 602*b* corresponding to the full body except for the face. It may also be possible to combine the overlap area of the face image 602*a* and the body image 602*b* by overlapping the face image 602*a* and the body image 602*b* and gradually making transparent the upper image by gradation so that the lower image is seen. Further, it may also be possible to combine the overlap area of the face image 602*a* and the body image 602*b* by a coefficient (a value). In a case where the resolution enhancement level y is large, that is, in a case where the resolution enhancement level y is larger than the threshold value $\theta_2$ (y>$\theta_2$), a dataset for each of the following regions is created. As the dataset for each region, mention is made of, for example, the dataset for each region obtained by cutting out a right-eye image 603*a* corresponding to the right eye, a left-eye image 603*b* corresponding to the left eye, and a mouth image 603*c* corresponding to the mouth from the face image.

The learning unit 405 performs learning by creating an individual neural network for each cut-out region. After performing the resolution enhancement of the corresponding region image by using the neural network of the corresponding region, the estimation unit 407 reconstructs the full-body image (full image) by integrating the region images whose resolution has been enhanced and outputs the full-body image to the display device 103. In a case where the degree of division is increased by this processing, highly accurate resolution enhancement specialized in the region is enabled. On the other hand, in accordance with the magnitude of the degree of division, the calculation cost is raised. For the object whose resolution enhancement level is high, the resolution enhancement at a high calculation cost and with a high accuracy is performed.

The division method of the full-body image into region images is not limited to the division example shown in FIG. 6 and it may also be possible to divide the image into regions, for example, such as the arm and the leg. Further, in the example described above, although the degree of division is set to three levels, the number of levels may be an arbitrary value.

<Object Specialization Type>

Second, it may also be possible to determine a degree of object specialization indicating to what extent learning specialized in a specific object is performed based on the resolution enhancement level.

First, by threshold value processing similar to that of the region specialization type described above, based on the resolution enhancement level, a degree of specialization in each object is derived. The degree of object specialization is a value that becomes small in proportion to the quantity other than the specific object or the magnitude of non-similarity with the specific object. In a case where the degree of object specialization is low, the same neural network is caused to learn a plurality of objects en bloc. In a case where the degree of object specialization is high, one neural network is caused to learn a specific object. In a case where the degree of object specialization is medium, the same neural network is caused to learn a plurality of objects en bloc, whose number is smaller than that in a case where the degree of object specialization is low and larger than that in a case where the degree of object specialization is high.

In a case where the degree of object specialization is low, in an example in which a sports player is captured as an object in a stadium, by causing one neural network to learn players of the same nationality or players of the same team, it is possible to reduce the total calculation cost although the accuracy is reduced.

As a specific processing example, a case is considered where the resolution enhancement level of players $k_1$, $k_2$, and $k_3$ is low and whose nationality is the same. The training images of the three players $k_1$, $k_2$, and $k_3$ are mixed without distinction and a data set $D_{\{1, 2, 3\}}$ is created. For example, it is assumed that there are low-resolution images $p_{k11}$ and $p_{k12}$ for learning and high-resolution images $q_{k11}$ and $q_{k12}$ for learning relating to the player $k_1$ included in the dataset. It is assumed that there are low-resolution images $pk_{21}$ and $pk_{22}$ for learning and high-resolution images $q_{k21}$ and $q_{k22}$ for learning relating to the player $k_2$ included in the dataset. And it is assumed that there are low-resolution images $p_{k31}$ and $p_{k32}$ for learning and high-resolution images q $k_{31}$ and $q_{k32}$ for learning relating to the player $k_3$ included in the dataset. In this case, for example, $D_{\{1, 2, 3\}}$ is represented in the form of $D_{\{1, 2, 3\}}=\{(p_{k11}, q_{k11}), (p_{k21}, q_{k21}), (p_{k31}, q_{k31}), (p_{k12}, q_{k12}), (p_{k22}, q_{k22}), (p_{k32}, q_{k32})\}$. Based on the conversion parameters learned on this dataset, the estimation unit 407 enhances the resolution of the input images of the three players.

<Environment Specialization Type>

Third, it may also be possible to determine a degree indicating to what extent learning specialized in a specific environment is performed based on the resolution enhancement level. The degree of environment specialization is a value that becomes small in proportion to the number of kinds of the specific environment. Specific processing thereof is explained by taking a case as an example where a sports player is captured during a game. For a sports player whose resolution enhancement level is higher, learning is performed with training images obtained by performing image capturing during a game for which it is desired to perform resolution enhancement. Due to this, it is possible to perform learning with the training images under the same illumination condition as that of the input image, and therefore, highly accurate resolution enhancement of an image is enabled. On the other hand, for a sports player whose resolution enhancement level is low, learning is performed in advance before the start of the game by using images captured in another game or images collected from a web. After that, by using training images obtained by performing image capturing during the game, additional learning is performed a small number of times. Due to this, although the accuracy of resolution enhancement of the image is reduced, the learning time after the start of the game can be reduced.

It may also be possible to set parameters for creating a dataset other than that described above based on the resolution enhancement level.

As explained above, according to the present embodiment, in a case where the resolution enhancement processing of an image is performed, it is possible to further improve the resolution of the image of a specific object. Further, in accordance with the degree of importance, it is possible to efficiently generate an image whose resolution has been enhanced for an object. That is, it is possible to efficiently generate an image whose resolution has been adjusted in accordance with the degree of importance.

In the present embodiment, the case is explained mainly where the resolution enhancement level is determined for each person as an object. Note that, the object that is the setting unit of the resolution enhancement level is not necessarily limited to a person. For example, the resolution enhancement level may be set for each region (head, upper body, lower body, and the like) of a person. Further, even for the same head, the resolution enhancement level may be different between the face and the back of head.

Second Embodiment

In the present embodiment, an example of a UI screen for setting a resolution enhancement level, which is displayed on the display device, is explained.

Figure 7:
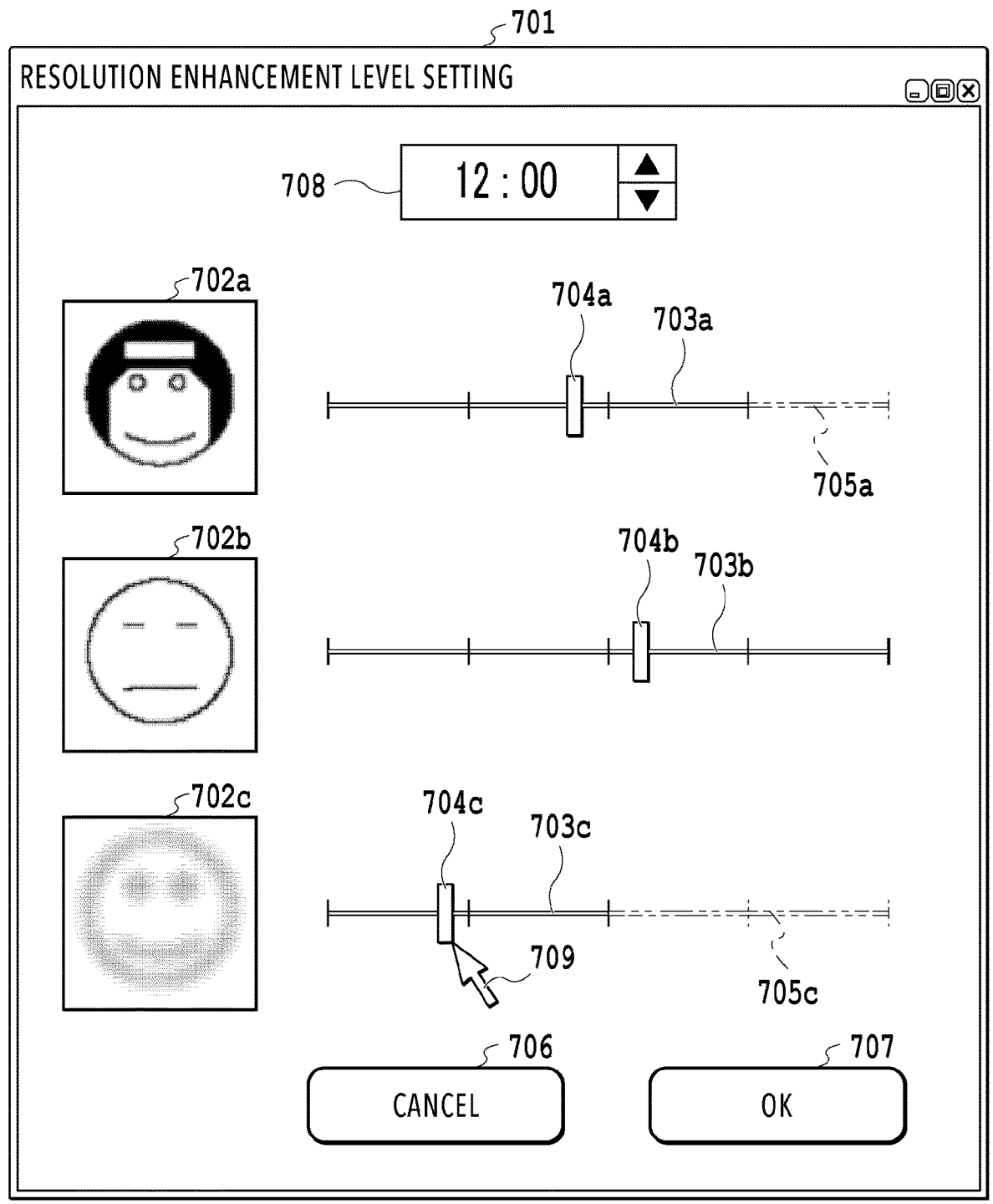
FIG. 7 is a diagram showing a Resolution enhancement level setting UI screen example.

FIG. 7 is a diagram showing an example of a user interface (UI) screen for setting a resolution enhancement level, which is displayed on the display device. A UI screen 701 is displayed on the display device 103 by the CPU 301. By a user operating a slider or an arrow button, to be described later, via the operation device 104, the resolution enhancement level of an object is adjusted.

The UI screen 701 has three window areas 702a, 702b, and 702c, slider bars 703a, 703b, and 703c corresponding to the window areas 702a, 702b, and 702c, respectively, a CANCEL button 706, and an OK button 707. The three window areas 702a, 702b, and 702c are each an area that displays a resolution-adjusted image example generated in accordance with the level, that is, a representative image example of each class of the resolution enhancement level. The slide bars 703a, 703b, and 703c each display the resolution enhancement level and are arranged to the right of the window areas 702a, 702b, and 702c, respectively. The UI screen 701 further has a time setting unit 708 configured to set the time of an image whose resolution has been enhanced. By a user clicking an arrow button of the time setting unit 708 by operating a pointer 709 via the operation device 104, a desired time is set. FIG. 7 shows the state where the time setting unit 708 is set to 12:00.

Following the above, the processing performed by the image processing apparatus 102 is explained with reference to FIG. 4, FIG. 5, and FIG. 7. S501, S502, and S504 to S507 are the same as those of the first embodiment, and therefore, explanation thereof is omitted.

At S503, the resolution enhancement level giving unit 403 displays the resolution enhancement level of each class, which is acquired and calculated, on the UI screen 701. The resolution enhancement level is visualized as the position of each of sliders 704a to 704c and it is indicated that as each of the sliders 704a to 704c moves toward the right side on each of the slider bars 703a, 703b, and 703c, the resolution enhancement level becomes higher and that as each of the sliders 704a to 704c moves toward the left side on each of the slider bars 703a, 703b, and 703c, the resolution enhancement level becomes lower. That is, the UI screen 701 has a level adjustment image for a user to adjust the level. In addition, in the window areas 702a, 702b, and 702c also, the resolution enhancement level is visualized as a image. This image is a preview image predicting in which degree the results of the resolution are obtained in a case where learning and resolution enhancement are performed at the resolution enhancement level. The preview image is created by reducing the resolution of the training image. It may also be possible to display the resolution enhancement level as a numerical value in place of the position of the sliders 704a to 704c on the slider bars 703a to 703c or the image in the window areas 702a to 702c.

It may also be possible for a user to change the resolution enhancement level of each class by moving the slider 704 by operating the pointer 709 via the operation device 104. At this time, the image processing apparatus 102 displays information on the upper limit value of the resolution enhancement level derived from the object information. Portions 705a and 705c where the slide bar is indicated by a broken line are areas where the upper limit value is exceeded. That is, the UI screen 701 is a screen for setting a resolution enhancement level and displays the resolution enhancement level in an adjustable manner in the range corresponding to the resolution enhancement level. It may also be possible to produce a display, such as a display in which the upper limit value is displayed as a boundary line and a display in which the area higher than or equal to the upper limit value is deleted. In a case where a user makes an attempt to set the resolution enhancement level to a value higher than or equal to the upper limit, the image processing apparatus issues a warning. It may also be possible to prohibit the setting of a value exceeding the upper limit. In a case where the position of the sliders 704a, 704b, and 704c is changed, the image processing apparatus 102 updates the preview image of the window areas 702a, 702b, and 702c in accordance with the position of the sliders 704a, 704b, and 704c after the change.

After the adjustment of the resolution enhancement level is completed, by a user clicking the OK button (determination button) 707 by operating the pointer 709 via the operation device 104, the set resolution enhancement level, which is the adjustment results, is saved in the secondary storage device, the external storage device, or the like. Further, by a user clicking the CANCEL button (withdrawal button) 706 by operating the pointer 709 via the operation device 104, the adjustment results are discarded (cancelled). At the time of saving the adjustment results, in a case where the time estimated necessary for learning exceeds the time limit, the image processing apparatus 102 reduces the resolution enhancement level by the scaling processing. It may also be possible to present a plurality of alternatives indicating for which class the resolution enhancement level is reduced and cause a user to make a selection. The obtained resolution enhancement level is given to each class.

Further, it may also be possible to store the resolution enhancement level adjusted by the operation of a user on the resolution enhancement level setting UI screen 701 and learn the parameters of the conversion function f based on the stored resolution enhancement level.

The secondary storage device 304 or the external storage device 308 stores a plurality of pairs of a resolution enhancement level y' input by a user and a vector x' of the object information on the object to which the resolution enhancement level is given. Then, the resolution enhancement level acquisition unit 402 acquires a plurality of pairs of the resolution enhancement level y' and the vector x' of the object information from the secondary storage device 304 or the external storage device 308 and learns the regression coefficient of the regression equation f so that the equation y'=f (x') holds. For the learning, a publicly known learning unit, such as the SVM and the neural network, is used. Derivation of the resolution enhancement level is performed by using the regression equation f obtained as the results of learning.

As explained above, according to the present embodiment, it is possible to reflect the preference and intention of a user in derivation of the resolution enhancement level in accordance with the degree of importance of an object, and therefore, it is made possible to set a more appropriate resolution enhancement level. The method of setting the degree of importance (resolution enhancement level) of an object based on the user operation is not limited to the above-described example. For example, the degree of importance of a person specified by the user operation from a list of a plurality of persons may be set higher than the degree of importance of the other persons. Further, for example, the degree of importance of a specific person may be set based on the user operation to specify the specific person in the image representing the image capturing area.

Third Embodiment

In the present embodiment, an example is explained in which virtual viewpoint image reconstruction processing is performed, in which from images (multi-viewpoint images) obtained by capturing an object by a plurality of image capturing apparatuses, an image (virtual viewpoint image) that is obtained in a case where the object is viewed from an arbitrary viewpoint is reconstructed.

Figure 8:
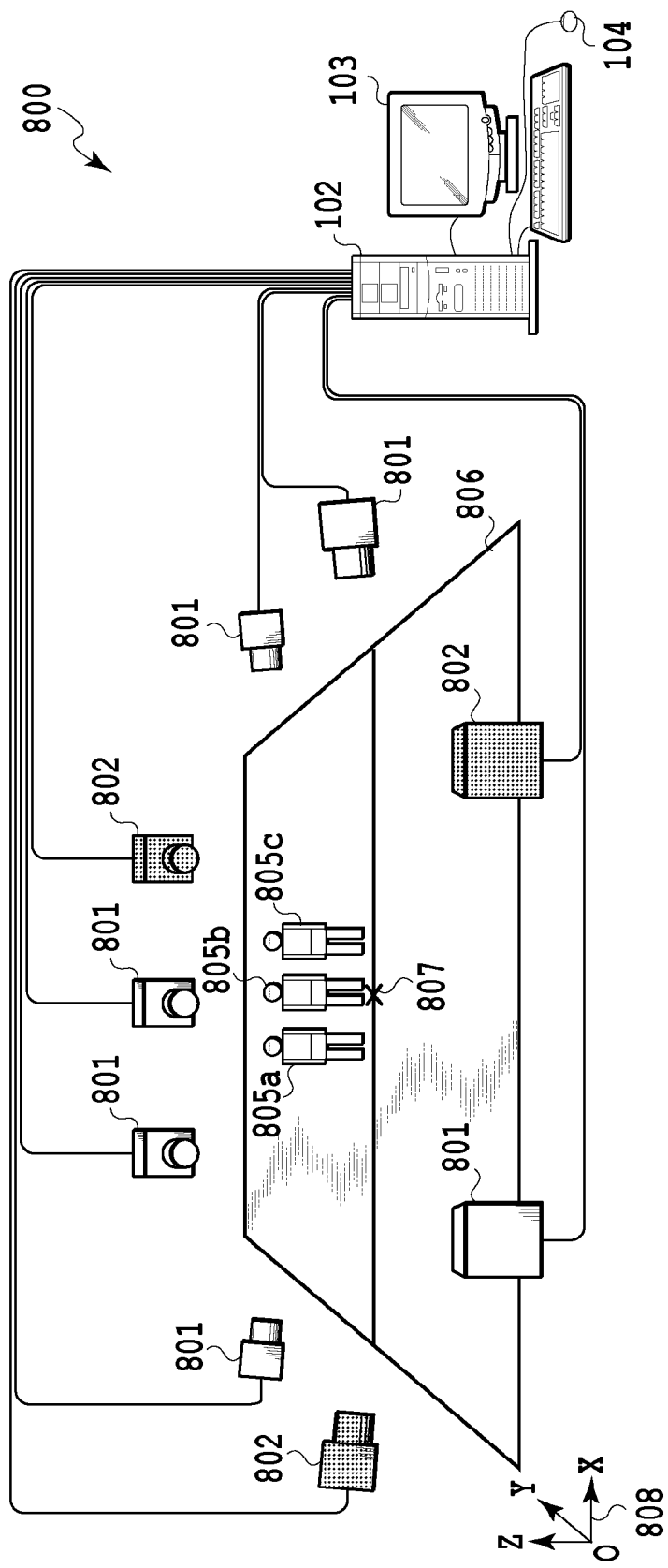
FIG. 8 is a schematic diagram of an image capturing system example including an image processing apparatus according to a third embodiment.
Figure 9A:
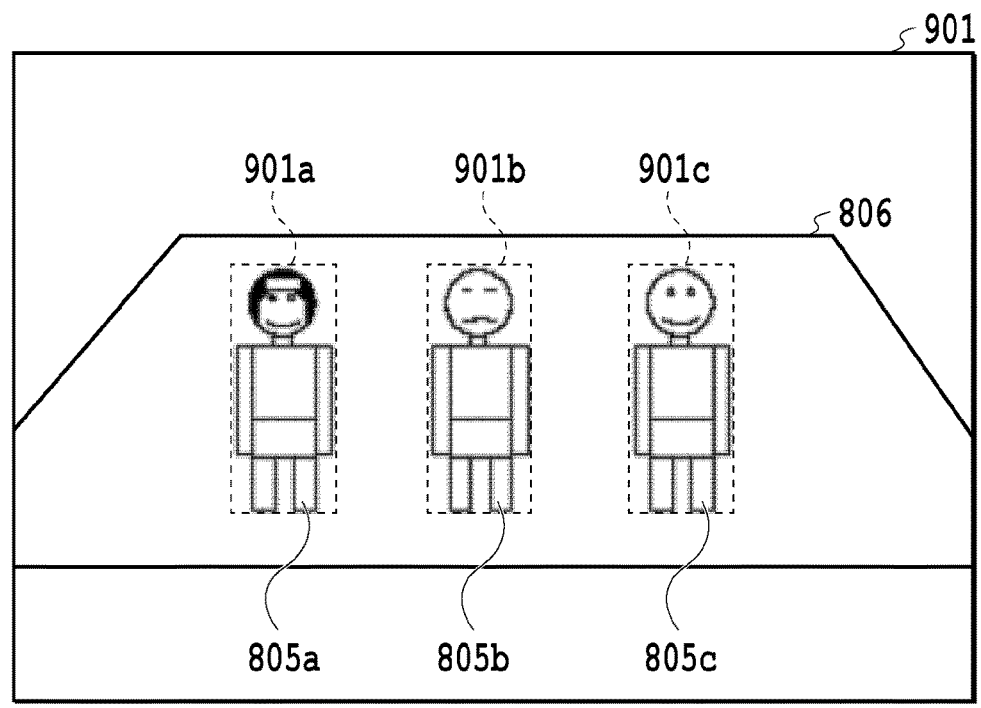
FIG. 9A and FIG. 9B are each a diagram showing an image example acquired by an image capturing apparatus.
Figure 9B:
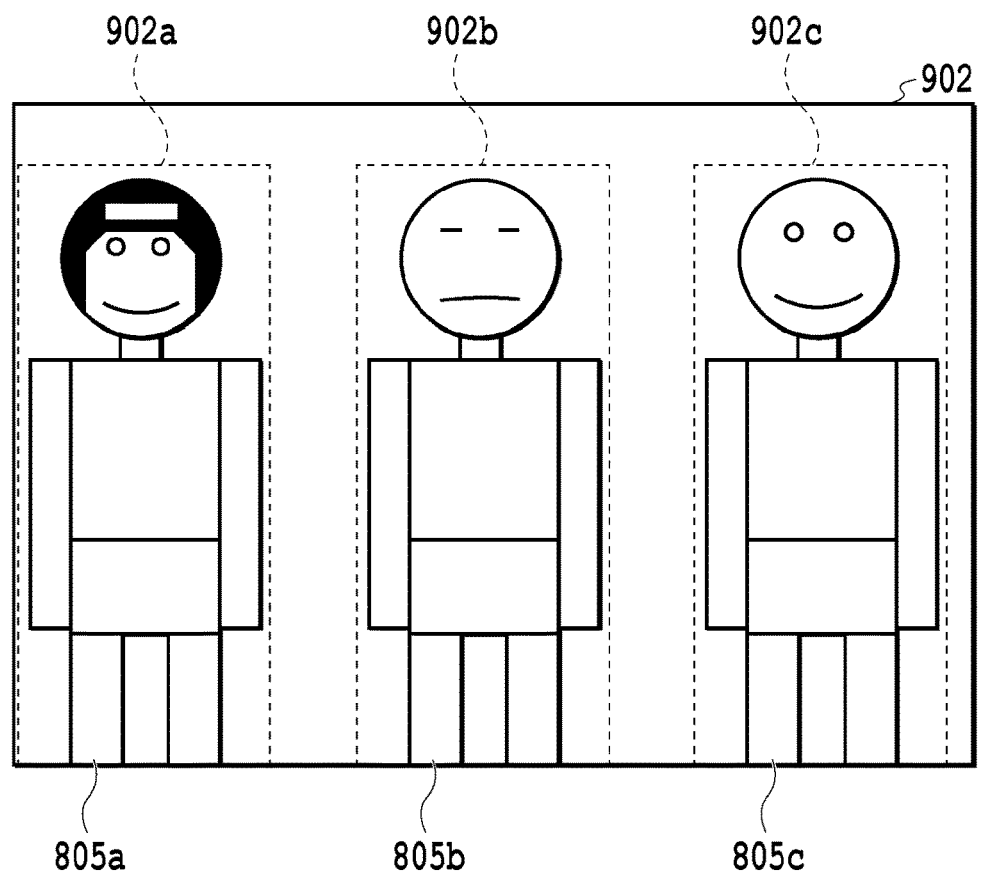

FIG. 8 is a schematic diagram showing an image capturing system example including an image processing apparatus according to the present embodiment. FIG. 9A is a diagram showing an input image example. FIG. 9B is a diagram showing a training image example. In the present embodiment, the same symbol is attached to the same apparatus or device as that of the first embodiment and explanation thereof is omitted. An image capturing system 800 has a plurality of (in the example shown schematically, six) image capturing apparatuses 801 for acquiring an input image 901 and a plurality of (in the example shown schematically, three) image capturing apparatuses 802 for acquiring a training image 902. Each of the apparatuses 102, 801, and 802 and the devices 103 and 104 of the image capturing system 800 is connected so as to be capable of transmission and reception of data with one another. Here, for simplicity, it is assumed that a gaze point 807 representing the center of the common area of the visual field of each image capturing apparatus 802 is set to the center of a field 806. The gaze point 807 is not limited to the center of the field 806 and for example, in a case of a soccer field, it may also be possible to set the gaze point 807 to an area whose degree of interest is high, such as an area in the vicinity of the goal area, the penalty area, and an area in the vicinity of the corner area.

A coordinate system 808 indicates a coordinate system used in a case of specifying the position of the camera, and the like. The field 806 as an image capturing-target area, which is a rectangular area on the xy-plane, is the range that is the target of image processing in the present embodiment. The captured image data by the image capturing apparatus 801 and the captured image data by the image capturing apparatus 802 are sent respectively to the image processing apparatus 102 and predetermined image processing is performed.

The plurality of the image capturing apparatuses 801 is each a camera whose focal length can be adjusted and which captures objects, capturing three sports players 805a, 805b, and 805c located on the field 806 of the stadium. The plurality of the image capturing apparatuses 801 each acquires input images (partial images) 901a to 901c, which are the target of resolution enhancement, from the image 901 obtained by capturing the objects. The input images 901a to 901c are each an image obtained by cutting out the object area corresponding to each of the sports players 805a to 805c from the image. Further, the plurality of the image capturing apparatuses 802 is also each a camera whose focal length can be adjusted and which captures objects, capturing the three sports players (objects) 805a, 805b, and 805c located on the field 806 of the stadium. The plurality of the image capturing apparatuses 802 each acquires training images 902a to 902c from the image 902 whose resolution is high compared to that of the image 901, which is obtained by capturing the sports players 805a to 805c. The training images 902a to 902c are each an image obtained by cutting out the object area corresponding to each of the sports players 805a, 805b, and 805c from the image 902.

The image processing apparatus 102 enhances the resolution of the input image and performs reconstruction of a virtual viewpoint image based on the multi-viewpoint captured images and the images as the results of the resolution enhancement. In the present embodiment, by using the information on the virtual viewpoint and the position information on each of the plurality of the image capturing apparatuses, the setting of the resolution enhancement level is performed more appropriately.

<Configuration of Image Processing Apparatus and Flow of Processing>

Figure 10:
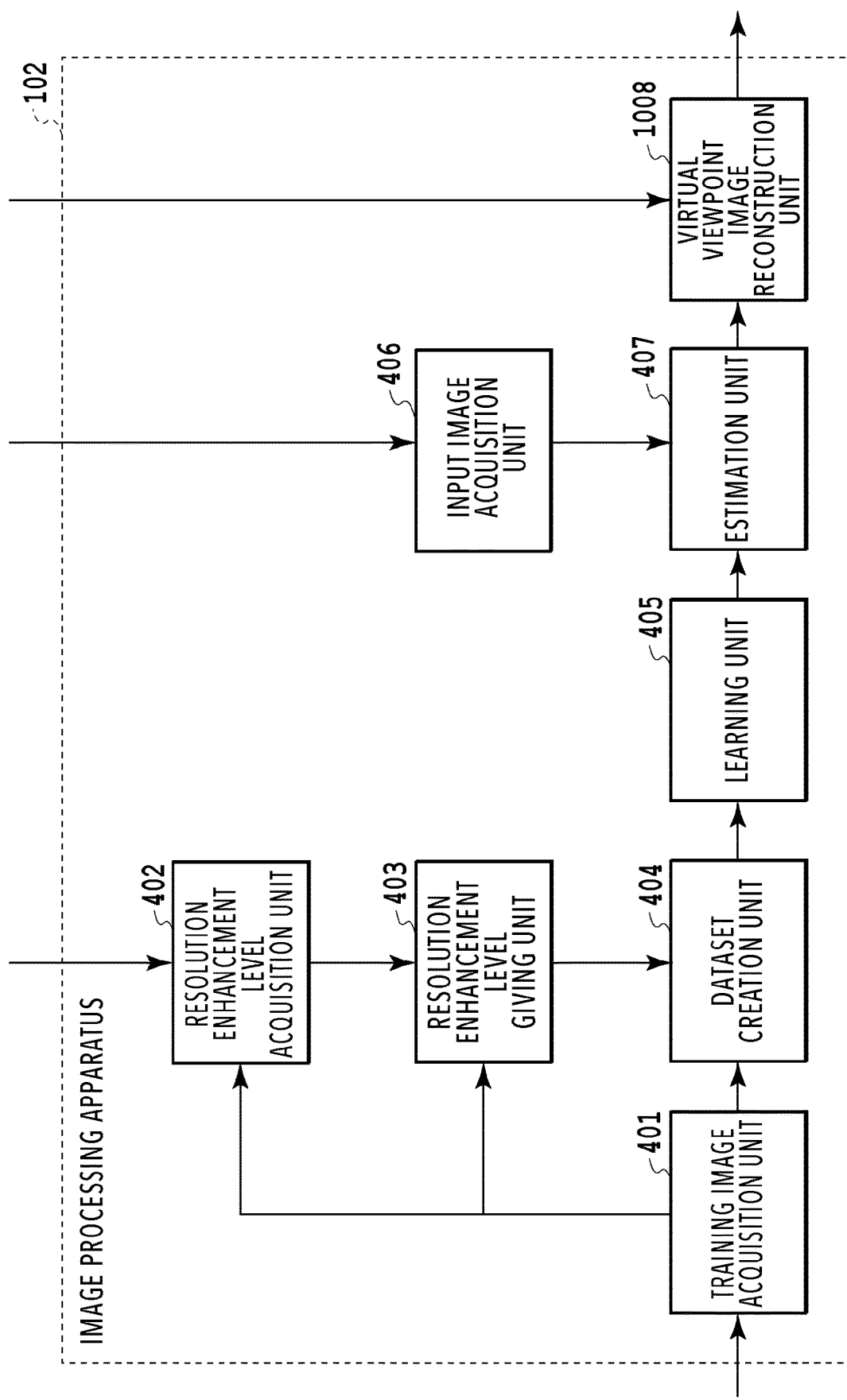
FIG. 10 is a block diagram showing a function configuration example of the image processing apparatus.
Figure 11:
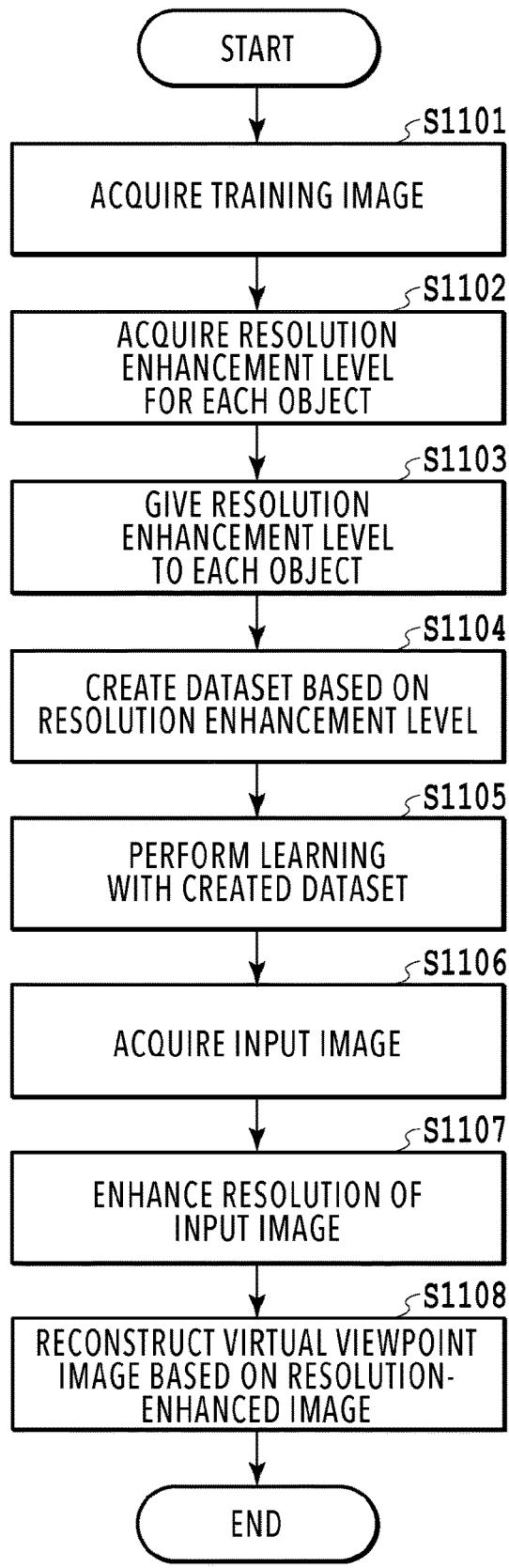
FIG. 11 is a flowchart showing a procedure example of reconstruction processing of a virtual viewpoint image.

In the following, the reconstruction processing of a virtual viewpoint image performed by the image processing apparatus 102 of the present embodiment is explained with reference to FIG. 10 and FIG. 11. FIG. 10 is a block diagram showing a function configuration example of the image processing apparatus 102 of the present embodiment. FIG. 11 is a flowchart showing a procedure example of the reconstruction processing of a virtual viewpoint image by the image processing apparatus 102 of the present embodiment. The image processing apparatus 102 of the present embodiment functions as each unit shown in FIG. 10 by the CPU 301 executing a program stored in the ROM 303 by using the RAM 302 as a work memory and performs a series of processing shown in the flowchart in FIG. 11. All the processing shown in the following do not need to be performed by the CPU 301 and it may also be possible to configure the image processing apparatus 102 so that part or all of the processing is performed by one or a plurality of processing circuits other than the CPU 301. In the following, the flow of the processing performed by each unit is explained.

The processing at S1101 in FIG. 11 is the same as the processing at S501 in the first embodiment.

At S1102, the resolution enhancement level acquisition unit 402 acquires camera information on each image capturing apparatus 802. In the camera information, information, such as the setting position of the camera, the gaze point position, and the focal length, is included. It may also be possible to acquire the camera information by reading camera information stored in advance in the secondary storage device 304 or the external storage device 308, or acquire the camera information by accessing each image capturing apparatus 802. Then, the resolution enhancement level acquisition unit 402 derives the distance between the object and the gaze point by a publicly known equation based the acquired camera information on each image capturing apparatus 802 and includes the derived distance in the object information as the element of the vector x.

It is considered that the event or the object in the vicinity of the gaze point is likely to attract attention from a user. Consequently, the conversion function f is set so that the resolution enhancement level of the object whose distance from the gaze point is short becomes high.

It may also be possible for the resolution enhancement level acquisition unit 402 to acquire parameters of the virtual camera (parameters of the virtual viewpoint). In the parameters of the virtual camera, parameters, such as the position of the virtual camera, the image capturing direction of the virtual camera, and the focal length, are included. The parameters of the virtual camera may be those stored in advance in the secondary storage device 304 or the external storage device 308, or those set by a user via the operation device 104 of the image processing apparatus 102 of the image capturing system 800. The virtual viewpoint may exist at a position different in accordance with time, or a plurality of virtual viewpoints may exist in the space.

The distance between the virtual viewpoint and the object, the object position on the image of the virtual viewpoint, the distance between the object and the image center on the image of the virtual viewpoint, the frequency with which the object is observed from the virtual viewpoint, the frequency with which the front side of the object is observed from the virtual viewpoint, and the like are derived. At least one of these pieces of information is added to the vector x of the object information as an element and based on the obtained vector x of the object information, the resolution enhancement level is derived.

It is considered that the object whose distance from the virtual viewpoint is short and the object whose frequency with which the object is viewed from the virtual viewpoint is high have a high degree of importance of resolution enhancement. On the contrary, it is considered that the object that is captured at the end portion on the virtual viewpoint image and the object only the backside of which is viewed have a low degree of importance of resolution enhancement. In order to reflect the degree of importance in the resolution enhancement level, the vector x of the object information is calculated based on the information on the virtual viewpoint.

Each piece of processing at S1103 to S1107 is the same as each piece of processing at S503 to S507 in the first embodiment.

At S1108, a virtual viewpoint image reconstruction unit 1008 reconstructs a virtual viewpoint image based on the object resolution-enhanced image obtained at S1107 and the parameters of the virtual camera (parameters of the virtual viewpoint). It may also be possible to acquire the parameters of the virtual camera by reading those stored in advance in the secondary storage device 304 or the external storage device 308, or acquire those set by a user via the operation device 104 of the image processing apparatus 102 of the image capturing system 800. Then, the virtual viewpoint image reconstruction unit 1008 outputs the reconstructed virtual viewpoint image to, for example, the display device 103.

As explained above, according to the present embodiment, it is made possible to set a resolution enhancement level that reflects the degree of importance of an object more appropriately.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present embodiment, in a case where resolution enhancement processing of an image is performed, it is possible to further improve the resolution of an image of a specific object.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-239861, filed Dec. 21, 2018, which is hereby incorporated by reference wherein in its entirety.

What is claimed is:

1. An image processing apparatus comprising:
one or more memories storing instructions; and
one or more processors executing the instructions to:
acquire a captured image of an image capturing area in which an object is located;
determine parameters to be used for image processing to improve resolution of an image of the object, by learning using a dataset of images of the object, wherein the dataset is generated based on object information indicating a degree of importance of the object and a number of pairs of images included in the dataset used for learning depends on the degree of importance of the object, each of the pairs of images including two images with different resolutions; and
perform the image processing to improve the resolution of the image of the object included in the acquired captured image, using the determined parameters,
wherein, in a case where an image of a first object and an image of a second object are included in the acquired captured image and a degree of importance of the first object is higher than the degree of importance of the second object, a number of pairs of images included in the dataset used for learning for the first object is larger than a number of pairs of images included in the dataset used for learning for the second object.

2. The image processing apparatus according to claim 1, wherein
the dataset for learning is a set of pairs of a low-resolution image of the object and a high-resolution image of the object.

3. The image processing apparatus according to claim 2, wherein
the higher a degree of importance of the object indicated by the object information is, the higher the resolution of the high-resolution image included in the dataset of images of the object.

4. The image processing apparatus according to claim 2, wherein
the one or more processors further execute the instructions to generate the dataset for learning by performing conversion processing in accordance with the degree of importance of the object indicated by the object information for a training image, which is the image of the object.

5. The image processing apparatus according to claim 4, wherein
the conversion processing includes at least one of processing to change the resolution of the training image and processing to divide the training image.

6. The image processing apparatus according to claim 4, wherein
a degree of specialization of the dataset for learning for a specific object or a specific environment is controlled in accordance with the degree of importance of the object.

7. The image processing apparatus according to claim 1, wherein
processing to improve resolution of the image of the first object is performed based on parameters determined by learning using the dataset in accordance with the degree of importance of the first object and processing to improve resolution of the image of the second object is performed based on parameters determined by learning using the dataset in accordance with the degree of importance of the second object, and
the degree of importance of the first object and the degree of importance of the second object are different.

8. The image processing apparatus according to claim 7, wherein
the resolution of the image of the first object and the resolution of the image of the second object, which are in the captured image after processing, are different.

9. The image processing apparatus according to claim 1, wherein
the object information includes information indicating at least one of an attribute of the object, a behavior of the object, and a behavior of another object for the object.

10. The image processing apparatus according to claim 1, wherein
the one or more processors further execute the instructions to set a resolution level relating to a change in the resolution of the image of the object based on a user operation, and
the object information indicates the resolution level as the degree of importance of the object.

11. The image processing apparatus according to claim 10, wherein
the one or more processors further execute the instructions to display the resolution level and an image of the resolution in accordance with the resolution level on a display screen for the user operation.

12. The image processing apparatus according to claim 1, wherein
the one or more processors further execute the instructions to generate a virtual viewpoint image in accordance with a position of a specified virtual viewpoint and a view direction from the specified virtual viewpoint based on the captured image after processing.

13. The image processing apparatus according to claim 12, wherein
the object information includes information indicating at least one of a distance between the virtual viewpoint and the object, a position relationship between the virtual viewpoint and the object, a frequency with which the object is observed from the virtual viewpoint, and a frequency with which the front side of the object is observed from the virtual viewpoint.

14. The image processing apparatus according to claim 1, wherein
the object is a person or a region of a person.

15. The image processing apparatus according to claim 1, wherein
the parameter is determined by performing learning by a neural network by using the dataset.

16. The image processing apparatus according to claim 1, wherein the resolution of the image of the object included in the captured image is improved by performing estimation processing by a neural network by using the parameter.

17. An image processing method comprising:
acquiring a captured image of an image capturing area in which an object is located by an image acquisition unit;
determining parameters to be used for image processing to improve resolution of an image of the object, by learning using a dataset of images of the object, wherein the dataset is generated based on object information indicating a degree of importance of the object and a number of pairs of images included in the dataset used for learning depends on the degree of importance of the object, each of the pairs of images including two images with different resolutions; and performing the image processing to improve the resolution of the image of the object included in the acquired captured image, using the determined parameters, wherein, in a case where an image of a first object and an image of a second object are included in the acquired captured image and a degree of importance of the first object is higher than the degree of importance of the second object, a number of pairs of images included in the dataset used for learning for the first object is larger than a number of pairs of images included in the dataset used for learning for the second object.

18. The image processing method according to claim 17, wherein processing to improve resolution of the image of the first object is performed based on parameters determined by learning using the dataset in accordance with the degree of importance of the first object and processing to improve resolution of the image of the second object is performed based on parameters determined by learning using the dataset in accordance with the degree of importance of the second object and the degree of importance of the first object and the degree of importance of the second object are different.

19. The image processing method according to claim 17, further comprising:

generating a virtual viewpoint image in accordance with a position of a specified virtual viewpoint and a view direction from the specified virtual viewpoint based on the captured image after processing by the image processing.

20. A non-transitory computer readable storage medium storing a program for causing a computer to perform an image processing method, the image processing method comprising:

acquiring a captured image of an image capturing area in which an object is located by an image acquisition unit;

determining parameters to be used for image processing to improve resolution of an image of the object, by learning using a dataset of images of the object, wherein the dataset is generated based on object information indicating a degree of importance of the object and a number of pairs of images included in the dataset used for learning depends on the degree of importance of the object, each of the pairs of images including two images with different resolutions; and performing the image processing to improve the resolution of the image of the object included in the acquired captured image, using the determined parameters wherein, in a case where an image of a first object and an image of a second object are included in the acquired captured image and a degree of importance of the first object is higher than the degree of importance of the second object, a number of pairs of images included in the dataset used for learning for the first object is larger than a number of pairs of images included in the dataset used for learning for the second object.

* * * * *